US012010609B2

(12) United States Patent
Fu et al.

(10) Patent No.: US 12,010,609 B2
(45) Date of Patent: Jun. 11, 2024

(54) TOWARDS ROBUST NOTIFICATION MECHANISM IN 5G SBA

(71) Applicant: Telefonaktiebolaget LM Ericsson (publ), Stockholm (SE)

(72) Inventors: Zhang Fu, Stockholm (SE); Göran Rune, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 17/615,463

(22) PCT Filed: May 31, 2019

(86) PCT No.: PCT/IB2019/054539

§ 371 (c)(1),
(2) Date: Nov. 30, 2021

(87) PCT Pub. No.: WO2020/240265

PCT Pub. Date: Dec. 3, 2020

(65) Prior Publication Data

US 2022/0232460 A1 Jul. 21, 2022

(51) Int. Cl.
*H04W 12/106* (2021.01)
*H04W 48/16* (2009.01)

(52) U.S. Cl.
CPC ......... *H04W 48/16* (2013.01); *H04W 12/106* (2021.01)

(58) Field of Classification Search
None
See application file for complete search history.

(56) References Cited

U.S. PATENT DOCUMENTS 10,708,053 B2 * 7/2020 Jain ........................ H04L 9/3213
10,873,464 B2 * 12/2020 Muhanna ............. H04L 9/0822

(Continued)

OTHER PUBLICATIONS

Author Unknown, "Technical Specification Group Services and System Aspects; System Architecture for the 5G System; Stage 2 (Release 15)," Technical Specification 23.501, Version 15.0.0, Dec. 2017, 3GPP Organizational Partners, 181 pages.

(Continued)

*Primary Examiner* — Kenneth B Wells
(74) *Attorney, Agent, or Firm* — Withrow & Terranova, PLLC

(57) ABSTRACT

Embodiments of a method in a core network, corresponding embodiments of methods in a service consumer and service producer, and corresponding embodiments of a service consumer and service producer are disclosed. In some embodiments, a method in a core network comprises, at a service consumer, generating security information for a subscription to an event and sending a subscribe message comprising the security information to a service producer of the event. The method further comprises, at the service producer, receiving the subscribe message and sending a notification message to the service consumer, where the notification message comprises the event and either: the security information or information derived from the security information. The method further comprises, at the service consumer, receiving the notification message and verifying the notification message based on the security information or the information derived from the security information, comprised in the notification message.

20 Claims, 14 Drawing Sheets

(56) References Cited

U.S. PATENT DOCUMENTS

| | | | | |
|---|---|---|---|---|
| 11,025,597 | B2 * | 6/2021 | Zhang | H04W 12/033 |
| 11,122,028 | B2 * | 9/2021 | Yabe | H04L 9/3213 |
| 11,303,622 | B2 * | 4/2022 | Gan | H04W 12/0431 |
| 2020/0119909 | A1 | 4/2020 | Zhang et al. | |

OTHER PUBLICATIONS

Author Unknown, "Technical Specification Group Services and System Aspects; Procedures for the 5G System; Stage 2 (Release 15)," Technical Specification 23.502, Version 15.0.0, Dec. 2017, 3GPP Organizational Partners, 258 pages.

Author Unknown, "Technical Specification Group Services and System Aspects; Study on Enhancements to the Service-Based Architecture (Release 16)," Technical Report 23.742, Version 16.0.0, Dec. 2018, 3GPP Organizational Partners, 133 pages.

Author Unknown, "Technical Specification Group Core Network and Terminals; 5G System; Technical Realization of Service Based Architecture; Stage 3 (Release 15)," Technical Specification 29.500, Version 15.0.0, Jun. 2018, 3GPP Organizational Partners, 28 pages.

Author Unknown, "Technical Specification Group Services and System Aspects; Security architecture and procedures for 5G system (Release 15)," Technical Specification 33.501, Version 15.0.0, Mar. 2018, 3GPP Organizational Partners, 128 pages.

Hardt, "The OAuth 2.0 Authorization Framework," Request for Comments: 6749, Oct. 2012, 76 pages.

Huawei, et al., "S3-171875: A security solution for service based architecture," 3GPP TSG SA WG3 (Security) Meeting #88, Aug. 7-11, 2017, Dali, China, 2 pages.

International Search Report and Written Opinion for International Patent Application No. PCT/IB2019/054539, dated Feb. 20, 2020, 16 pages.

* cited by examiner

TOWARDS ROBUST NOTIFICATION MECHANISM IN 5G SBA

This application is a 35 U.S.C. § 371 national phase filing of International Application No. PCT/IB2019/054539, filed May 31, 2019, the disclosure of which is incorporated herein by reference in its entirety.

TECHNICAL FIELD

The present disclosure relates to event notification in a cellular communications system having a Service Based Architecture (SBA).

BACKGROUND

In the current Third Generation Partnership Project (3GPP) specification for the Fifth Generation (5G) core network (i.e., the 5GC), 5G System (5GS) architecture is defined to support data connectivity and services enabling deployments to use techniques such as, e.g., Network Function Virtualization (NFV) and Software Defined Networking (SDN). The 5GS architecture leverages service-based interactions between Control Plane (CP) Network Functions (NFs) which are identified in [1]. FIG. 1 shows the basic Service Based Architecture (SBA) of the 5GC. NFs expose their abilities as services that can be used by other NFs. For example, the Access and Mobility Management Function (AMF) exposes a service that enables an NF to communicate with the User Equipment (UE) and/or the Access Network (AN) through the AMF; the Session Management Function (SMF) exposes a service that allows consumer NFs to handle the Protocol Data Unit (PDU) sessions of UEs.

NFs expose their services by registering themselves to the NF Repository Function (NRF). The NRF also offers service discovery to enable NFs to find each other.

NFs can expose events that can be consumed by other NFs. For example, FIG. 2 illustrates the typical call flow for event exposure through notification mechanism for an AMF. The AMF provides the Namf_EventExposure service [2], which can expose UE access and mobility events, e.g. location changes, access type changes, connectivity state changes, etc. A service consumer can use the Namf_EventExposure_Subscribe message to subscribe to a specific event (step 200). The AMF responds with an Accept message including a Subscription Identifier (ID) (step 202). The AMF, being the service producer, uses the Namf_EventExposure_Notify message to send the event to the service consumer (step 204). The service consumer can use the Namf_EventExposure_UnSubscribe message to unsubscribe from the corresponding event (step 206).

In the current 3GPP specification, when a service consumer subscribes to an event, the service consumer will subscribe to an instance of the service producer NF. To deal with the failure or replacement of a service producer, the service consumer needs to subscribe to the event of a replacement service producer instance. Furthermore, in order to be notified of failures of service producer instances, the service consumer also needs to subscribe to the NRF for the event of failures of the service producer instances. The details about the AMF as event producer (also referred to as event provider) can be found in 3GPP Technical Specification (TS) 29.500 V15.3.0 [3].

When the service consumer detects or receives information about the failure or replacement of the service producer instance, the service consumer must find a new service producer instance, either by service discovery to the NRF or using some backup instance list, and subscribe to the new service producer instance. The current solution is less than ideal and, as such, an improved solution is needed.

SUMMARY

Systems and methods are disclosed for decoupling a service producer and a service consumer regarding subscription and notification services in a core network (e.g., a Fifth Generation Core Network (5GC)) having a Service Based Architecture (SBA). Embodiments of a method in a core network are disclosed. In some embodiments, a method for subscription and notification of events in a core network of a cellular communications system in which the core network has a SBA comprises, at a service consumer in the core network, generating security information for a subscription to an event and sending a subscribe message comprising the security information to a service producer in the core network, the service producer being a service producer of the event. The method further comprises, at the service producer, receiving the subscribe message comprising the security information from the service consumer and sending a notification message to the service consumer, where the notification message comprises the event and either: the security information or information derived from the security information. The method further comprises, at the service consumer, receiving the notification message from the service producer and verifying the notification message based on the security information or the information derived from the security information, comprised in the notification message, and the security information generated at the service consumer. In some embodiments, the security information is a key or token. By decoupling the service producer and the service consumer, latency associated with failure or replacement of the service consumer can be avoided.

Embodiments of a method performed by a service consumer and corresponding embodiments of a service consumer are disclosed. In some embodiments, a method performed by a service consumer for subscription and notification of events in a core network of a cellular communications system in which the core network has a SBA comprises generating first security information for a subscription to an event and sending a subscribe message to a service producer of the event, the subscribe message comprising the first security information. The method further comprises receiving a notification message from the service producer, the notification message comprising the event and second security information, the second security information comprising the first security information or information derived from the first security information. The method further comprises verifying the notification message based on the first security information generated at the service consumer and the second security information comprised in the notification message.

In some embodiments, the first security information comprises a security key. In some embodiments, the second security information comprises information derived from the security key.

In some embodiments, the first security information comprises a token. In some embodiments, the second security information comprises the token.

In some embodiments, the subscribe message further comprises information that identifies the service consumer or information that identifies a data storage component of the service consumer. In some other embodiments, the subscribe message further comprises a Fully Qualified Domain Name (FQDN), Uniform Resource Locator (URL), or Internet Protocol (IP) address of the service consumer or a FQDN, URL, or IP address of the data storage component of the service consumer.

In some embodiments, the subscribe message further comprises a notification Identifier (ID) and the notification message comprises the notification ID.

In some embodiments, the method further comprises receiving a subscription accept message in response to the subscribe message, the subscription accept message comprising a subscription ID.

In some embodiments, the service consumer comprises a data storage component and a consumer component that consumes the event, and receiving the notification message from the service producer comprises receiving the notification message at the data storage component. In some embodiments, verifying the notification message comprises verifying the notification message at the data storage component. In some embodiments, the method further comprises communicating the event from the data storage component to the consumer component of the service consumer.

In some embodiments, the method further comprises deciding to unsubscribe from the event, and sending an unsubscribe message to either the service producer that sent a last notification message for the event or a service producer that sends a next notification message for the event. In some embodiments, the unsubscribe message comprises third security information, the third security information being information derived from the first security information. In some other embodiments, the method further comprises receiving third security information from the service producer, wherein the unsubscribe message comprises the third security information.

In some embodiments, a service consumer for subscription and notification of events in a core network of a cellular communications system in which the core network has a SBA is adapted to generate first security information for a subscription to an event and send a subscribe message to a service producer of the event, the subscribe message comprising the first security information. The service consumer is further adapted to receive a notification message from the service producer, the notification message comprising the event and second security information, the second security information comprising the first security information or information derived from the first security information. The service consumer is further adapted to verify the notification message based on the first security information generated at the service consumer and the second security information comprised in the notification message.

In some embodiments, the service consumer comprises a network node that implements a network function that comprises the service consumer, wherein the network node comprises a network interface and processing circuitry associated with the network interface. The processing circuitry is configured to cause the network node to implement the network function such that the service consumer is adapted to generate the first security information for the subscription to the event, send the subscribe message to the service producer of the event, receive the notification message from the service producer, and verify the notification message based on the first security information generated at the service consumer and the second security information comprised in the notification message.

In some embodiments, the service consumer comprises one or more network nodes that implement a service consumer, the service consumer comprising a data storage component and a consumer component. Each network node of the one or more network nodes comprises a network interface and processing circuitry associated with the network interface. The processing circuitry of the one or more network nodes is configured to cause the one or more network nodes to implement the service consumer such that: (a) the consumer component of the service consumer is adapted to generate the first security information for the subscription to the event and send the subscribe message to the service producer of the event, the subscribe message comprising the first security information; and (b) the data storage component of the service consumer is adapted to receive the notification message from the service producer, verify the notification message based on the first security information generated at the service consumer and the second security information comprised in the notification message, and communicate the event to the consumer component of the service consumer.

Embodiments of a method performed by a service producer and corresponding embodiments of a service producer are also disclosed. In some embodiments, a method performed by a service producer for subscription and notification of events in a core network of a cellular communications system in which the core network has a SBA comprises receiving a subscribe message from a service consumer for a subscription to an event, the subscribe message comprising first security information for the subscription to the event. The method further comprises storing the first security information in a subscription context for the subscription to the event by the service consumer. The method further comprises sending a notification message to the service consumer, where the notification message comprises the event and second security information. The second security information comprises the first security information or information derived from the first security information.

In some embodiments, the first security information comprises a security key. In some embodiments, the second security information comprises information derived from the security key.

In some embodiments, the first security information comprises a token. In some embodiments, the second security information comprises the token.

In some embodiments, the subscribe message further comprises: information that identifies the service consumer or information that identifies a data storage component of the service consumer. In some other embodiments, the subscribe message further comprises a FQDN, URL, or IP address of the service consumer or a FQDN, URL, or IP address of a data storage component of the service consumer.

In some embodiments, the subscribe message further comprises a notification ID, and the notification message comprises the notification ID.

In some embodiments, the method further comprises sending a subscription accept message to the service consumer in response to the subscribe message, the subscription accept message comprising a subscription ID.

In some embodiments, the service consumer comprises a data storage component and a consumer component that consumes the event, and sending the notification message to the service consumer comprises sending the notification message to the data storage component of the service consumer.

In some embodiments, the method further comprises receiving an unsubscribe message from the service consumer or a replacement service consumer for the service consumer, wherein the unsubscribe message comprises third security information. The third security information being information derived from the first security information. The method further comprises verifying the unsubscribe message based on the stored first security information and the third security information.

In some embodiments, the method further comprises generating and sending third security information to the service consumer, receiving an unsubscribe message from the service consumer or a replacement service consumer for the service consumer wherein the unsubscribe message comprises the third security information, and verifying the unsubscribe message based on the stored first security information and the third security information.

In some embodiments, a service producer for subscription and notification of events in a core network of a cellular communications system in which the core network has a SBA is adapted to receive a subscribe message from a service consumer for a subscription to an event, the subscribe message comprising first security information for the subscription to the event. The service producer is further adapted to store the first security information in a subscription context for the subscription to the event by the service consumer and send a notification message to the service consumer, the notification message comprising the event and second security information, the second security information comprising the first security information or information derived from the first security information.

In some embodiments, the service producer comprises a network node that implements a network function that comprises the service producer, wherein the network node comprises a network interface and processing circuitry associated with the network interface. The processing circuitry is configured to cause the network node to implement the network function such that the service producer is adapted to receive the subscribe message from the service consumer for the subscription to the event, store the first security information in the subscription context for the subscription to the event by the service consumer, and send the notification message to the service consumer.

In some embodiments, a method performed by a replacement service producer in a core network of a cellular communications system in which the core network has a SBA comprises obtaining a subscription context for a subscription to an event by a service consumer, the subscription context comprising first security information for the subscription to the event. The method further comprises sending a notification message to the service consumer, the notification message comprising the event and second security information. The second security information comprises the first security information or information derived from the first security information.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
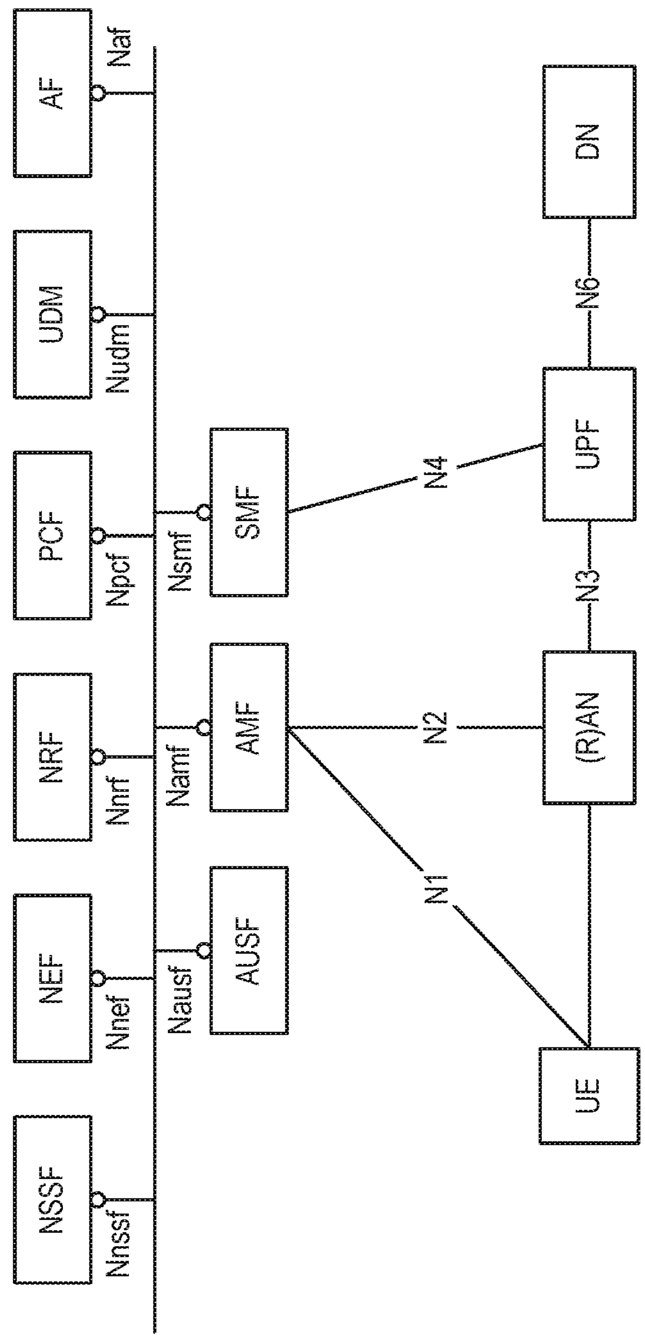
FIG. 1 shows the basic Service Based Architecture (SBA) of the Fifth Generation Core Network (5GC)
Figure 2:
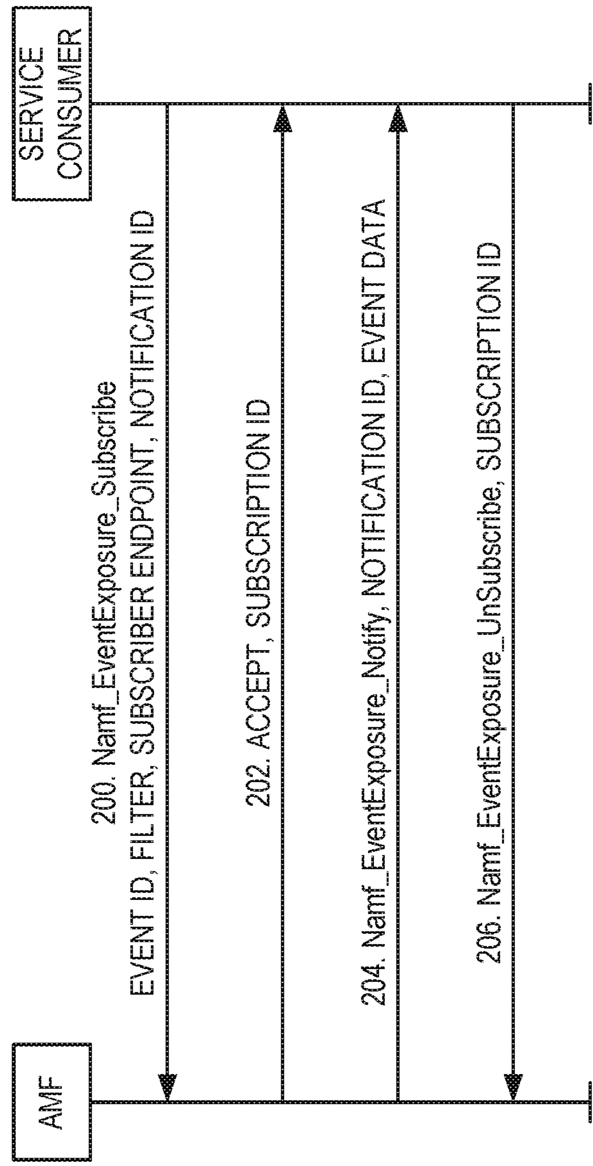
FIG. 2 illustrates the typical call flow for event exposure through a notification mechanism for an Access and Mobility Management Function (AMF) in the 5GC.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a “radio node” is either a radio access node or a wireless device.

Radio Access Node: As used herein, a “radio access node” or “radio network node” is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network, a gNB that combines NR and Long Term Evolution (LTE) technologies, or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a NF Repository Function (NRF), a Policy Control Function (PCF), a Unified Data Management (UDM), or the like.

Network Function and Network Function Instance: As used herein, a "network function" or "NF" is a core network function such as, e.g., an AMF, UPF, SMF, AUSF, NSSF, NEF, NRF, PCF, UDM, or the like in a core network (e.g., a 5G Core Network (5GC)). The term "NF instance" is used to differentiate between NFs of the same type (e.g., a first AMF instance and a second AMF instance that replaces the first AMF instance, e.g., when the first AMF instance fails). Note that the terms "NF" and "NF instance" and the like are used interchangeably herein unless otherwise explicitly stated or required by the context of the term in the description.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the Radio Access Network (RAN) or the core network of a cellular communications network/system.

Service Producer: As used herein, a "service producer" is a network entity that provides a service of a NF. In some embodiments, a service producer is a service comprised in a NF (i.e., a particular service exposed by a NF). As an example, the service producer may be a service (e.g., the Namf_EventExposure service) of an AMF. In this case, the NF may also be referred to as the service producer of a particular service. In some other embodiments, the service producer comprises a data storage component and a producer component. In this regard, both the data storage component and the producer component of the service producer may be implemented in a single NF (e.g., as separate software components), distributed across different NFs (e.g., the data storage component may be implemented at a first NF (e.g., a UDM) and the consumer component may be implemented at a second NF (e.g., an AMF)), or implemented in an NF and another network entity (e.g., consumer component at an NF (e.g., an AMF) and the data storage component at an external data storage network entity).

Service Consumer: As used herein, a "service consumer" is a network entity that consumes a particular service of a service producer. In some embodiments, the service consumer is comprised in a core NF. As an example, the core NF may be a SMF, where the service consumer is part of the core NF that consumes a particular service of a service producer such as, e.g., the Namf_Event_Exposure service of an AMF. In some other embodiments, the service consumer comprises a data storage component and a consumer component. In this regard, both the data storage component and the consumer component of the service consumer may be implemented in a single NF (e.g., as separate software components), distributed across different NFs (e.g., the data storage component may be implemented at a first NF (e.g., a UDM) and the consumer component may be implemented at a second NF (e.g., a SMF)), or implemented in a NF and another network entity (e.g., consumer component at an NF (e.g., a SMF) and the data storage component at an external data storage network entity).

Service Producer Instance: As used herein, a "service producer instance" is a particular service producer instance. The term "instance" is used to differentiate between service producers of the same type (e.g., a first service producer instance and a second service producer instance that replaces the first service producer instance, e.g., when the first service producer instance fails). Note that the terms "service producer" and "service producer instance" are used interchangeably herein unless otherwise explicitly stated or required by the context of the term in the description.

Service Consumer Instance: As used herein, a "service consumer instance" is a particular instance of a service consumer. The term "instance" is used to differentiate between service consumers of the same type (e.g., a first service consumer instance and a second service consumer instance that replaces the first service consumer instance, e.g., when the first service consumer instance fails). Note that the terms "service consumer" and "service consumer instance" are used interchangeably herein unless otherwise explicitly stated or required by the context of the term in the description.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The current solution for dealing with the failure and replacement of a service producer in the 5GC has two main drawbacks. First, the latency between detecting the failure of the service producer instance and subscribing to a new provider instance may be long, especially if this has to be done via the NRF. Furthermore, the service consumer may miss some events due to the failure of the service producer instance. Second, the current solution couples the service consumer (i.e., the service subscriber) and the service producer (i.e., the service publisher) together, which is not scalable since one service producer instance failure and replacement will affect all of the service consumers tied to that service producer instance. One principle of the Service Based Architecture (SBA) of the 5GC is the independency of NFs such that that one NF can scale in or out and fail or recover without affecting other NFs. The current solution apparently violates this principle.

When removing the binding between service producer and service consumer, there is a need for a mechanism to enable the service consumer to know that notification messages are from the service producer, rather than some malicious entity. Likewise, there is a need for a mechanism to enable the service producer to known that an unsubscribe message is from the service consumer, rather than some malicious entity.

Embodiments of a solution for decoupling a service producer and a service consumer regarding the subscription and notification services in a core network (e.g., a 5GC) having a SBA are disclosed herein. In some embodiments, security information (e.g., credentials) are used in the subscription and/or notification procedure to mask failure or replacement of the service producer. More specifically, in some embodiments, the service consumer provides a credential (e.g., a token or key) to the service producer in the subscription request. The service producer uses the security information to send event messages to the service consumer. When the service producer fails or gets replaced, the new service producer instance uses the same security information to send event messages to the service consumer. This requires persistence of the security information, something that can be achieved in multiple ways.

As one way to achieve persistent event message handling, in some embodiments, a data storage component of the service consumer is used. More specifically, in some embodiments, the event notification messages are sent from the service producer to the data storage component of the service consumer so that the service consumer does not need to be aware of failures or replacement of the service producer. Also, persistence on the service consumer side allows the service producer to be unaware of any failure or replacement of the service consumer. At the service consumer, the corresponding consumer component obtains the event data from the data storage, which avoids a message miss due the failure or replacement.

Figure 3:
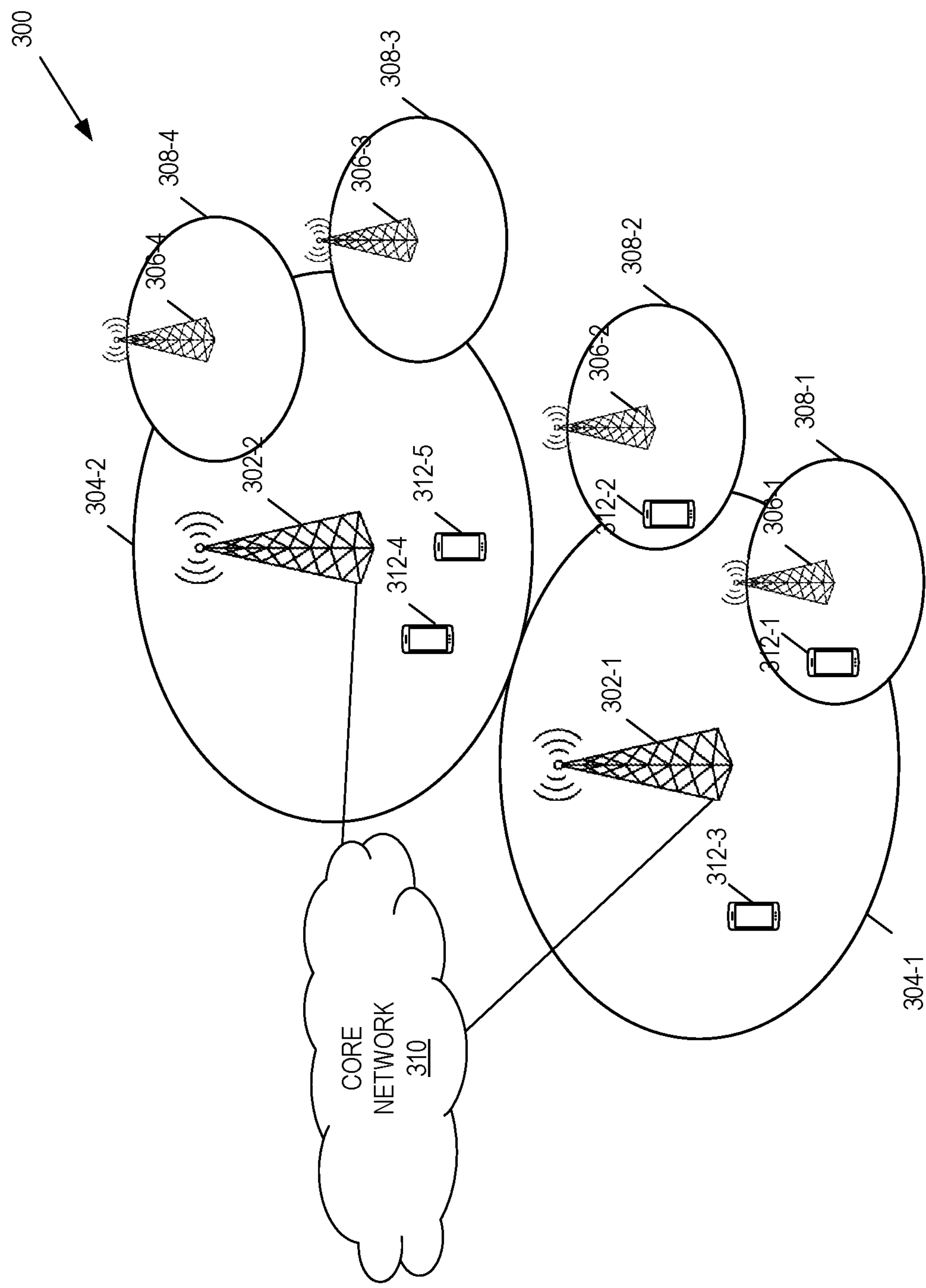
FIG. 3 illustrates one example of a cellular communications system according to some embodiments of the present disclosure.

FIG. 3 illustrates one example of a cellular communications system 300 in which embodiments of the present disclosure may be implemented. In the embodiments described herein, the cellular communications system 300 is a 5G system (5GS) including a NR RAN (i.e., a NR RAN) and a 5GC. However, the embodiments described herein are not limited to the 5GS and may be implemented in other types of wireless communication systems such as, e.g., the Evolved Packet System (EPS) including a LTE RAN. In this example, the RAN includes base stations 302-1 and 302-2, which in 5G NR are referred to as gNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as macro cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5GC. The base stations 302 (and optionally the low power nodes 306) are connected to the core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
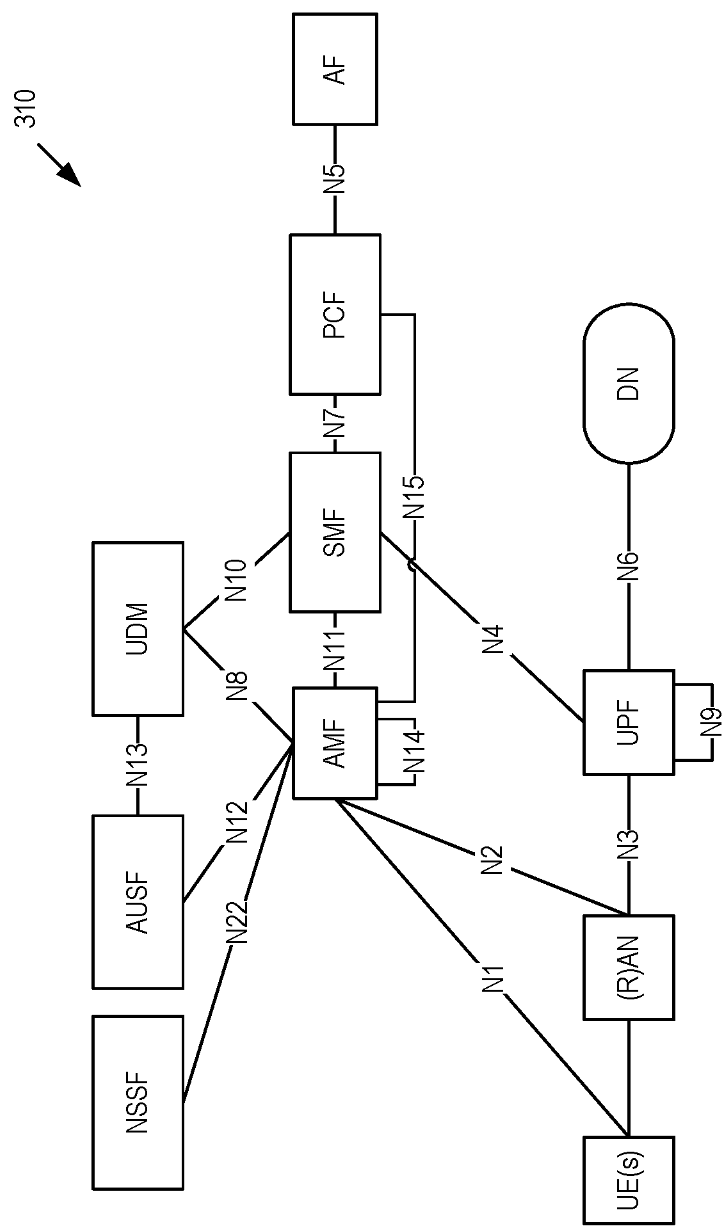
FIGS. 4 and 5 illustrate example architectures for the cellular communications system of FIG. 3 according to some embodiments of the present disclosure.

FIG. 4 illustrates a wireless communication system represented as a 5G network architecture composed of core NFs, where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of UEs connected to either a RAN or an Access Network (AN) as well as an AMF. Typically, the R(AN) comprises base stations, e.g. such as eNBs or gNBs or similar. Seen from the core network side, the 5G core NFs shown in FIG. 4 include a NSSF, an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 4, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RU) between UEs and data network for some applications requiring low latency.

The core 5G network architecture is composed of modularized functions. For example, the AMF and SMF are independent functions in the Control Plane (CP). Separated AMF and SMF allow independent evolution and scaling. Other CP functions like the PCF and AUSF can be separated as shown in FIG. 4. Modularized function design enables the 5G core network to support various services flexibly.

Each NF interacts with another NF directly. It is possible to use intermediate functions to route messages from one NF to another NF. The user plane supports interactions such as forwarding operations between different UPFs.

Figure 5:
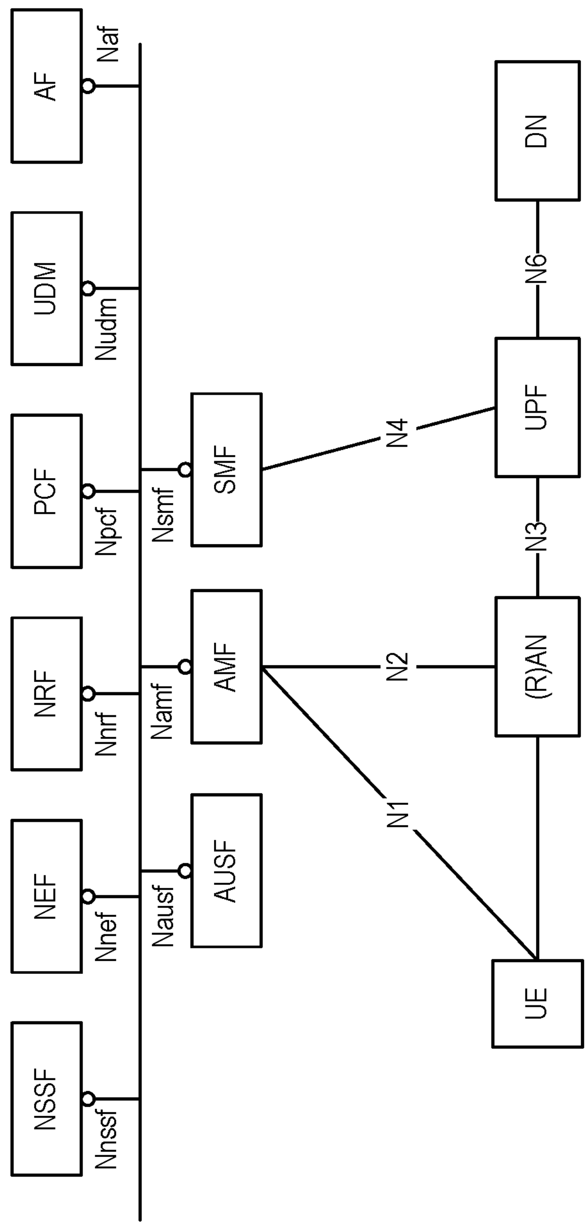

FIG. 5 illustrates a 5G network architecture using service-based interfaces between the NFs in the CP, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g. Namf for the service based interface of the AMF and Nsmf for the service based interface of the SMF etc. The NEF and the NRF in FIG. 5 are not shown in FIG. 4 discussed above. However, it should be clarified that all NFs depicted in FIG. 4 can interact with the NEF and the NRF of FIG. 5 as necessary, though not explicitly indicated in FIG. 4.

Some properties of the NFs shown in FIGS. 4 and 5 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 6:
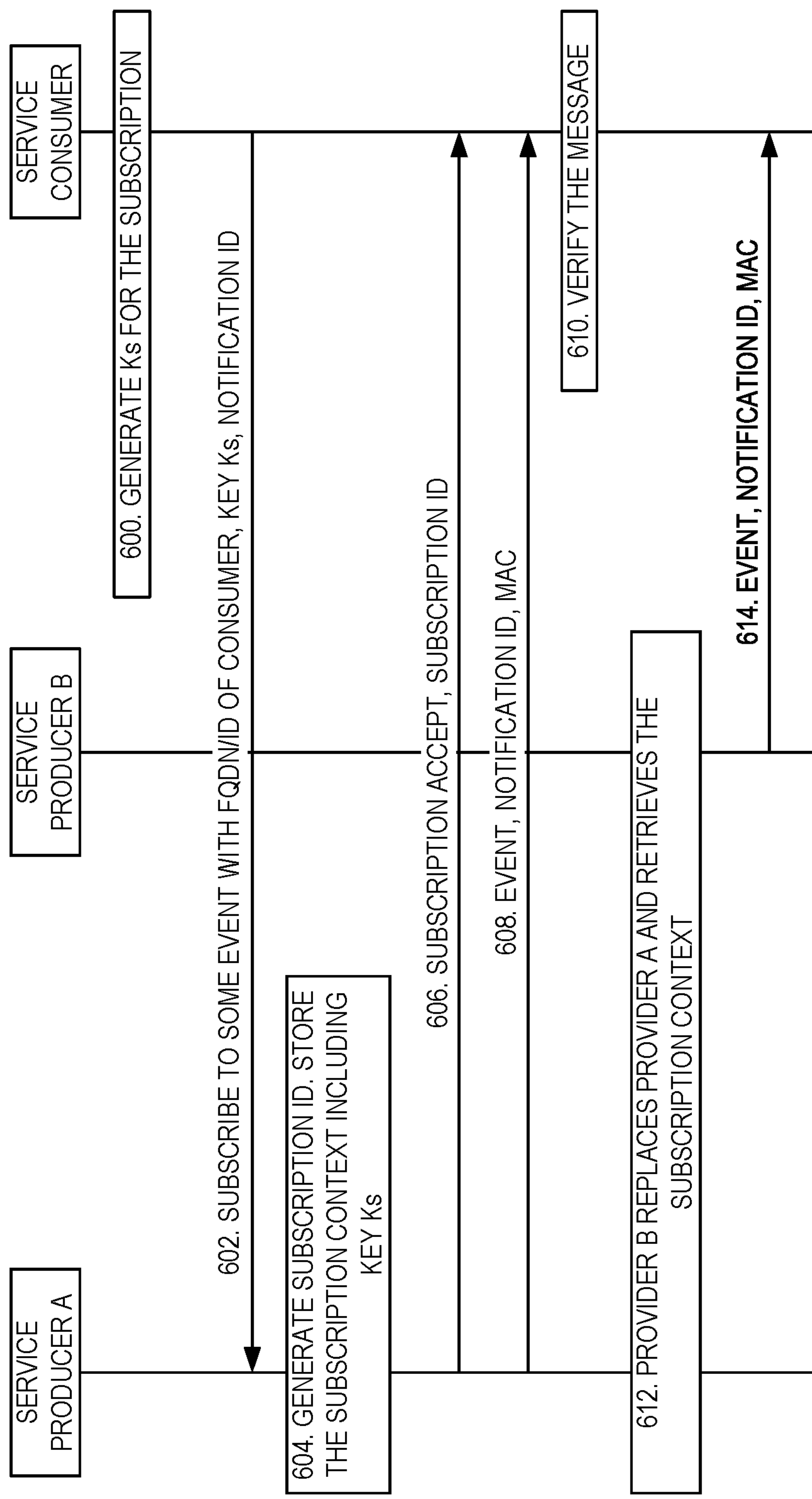
FIG. 6 illustrates the operation of a service producer, a replacement service producer, and a service consumer to utilize a key as the security information, or credential, during a subscription and notification procedure in accordance with some embodiments of the present disclosure.

FIG. 6 illustrates the operation of a service producer, a replacement service producer, and a service consumer to utilize a key as the security information, or credential, during a subscription and notification procedure in accordance with some embodiments of the present disclosure. As illustrated, when the service consumer wants to subscribe to an event, the service consumer generates a key (denoted as Ks) for this subscription (step 600). Mechanisms for generating keys are well-known and, as such, are not the subject of the present disclosure. Any appropriate mechanism for generating $K_s$ may be used. The service consumer sends a subscription request to a service producer (denoted as Service Producer A) of the service (step 602). Ks is included in the subscription request. In addition, the subscription request may include information such as, e.g., a Fully Qualified Domain Name (FQDN) or Identifier (ID) of the service consumer and/or a notification ID.

Service Producer A generates a subscription ID for the subscription of the service consumer (e.g., as defined in [2]) and stores a subscription context for the service consumer (step 604). The subscription context includes $K_s$. The subscription context may also include other information such as, e.g., the FQDN or ID of the service consumer, the notification ID, and/or the subscription ID. The subscription context may, for example, be stored at Service Producer A or in some storage that is accessible to Service Producer A and, e.g., any replacement service producer. Service Producer A sends an acceptance message back to the service consumer (step 606). In this example, the acceptance message includes the subscription ID.

When the corresponding event occurs, Service Producer A sends a notification message to the service consumer (step 608). In this example, the notification message includes event data, the notification ID, and a Message Authentication Code (MAC). For example, MAC=HASH (Ks, event data). The service consumer verifies the notification message using the MAC comprised in the notification message and $K_s$, which is stored at the service consumer (step 610). More specifically, in this example, the service consumer uses $K_s$ and in this example the event data comprised in the notification message to generate an expected MAC using the same algorithm used by Service Producer A (e.g., expected MAC=HASH ($K_s$, event data)). The service consumer then compares the generated expected MAC to the MAC comprised in the notification message. If they are the same, then the notification message is verified and the service consumer will consume the notification message and, in particular, the event data included in the notification message. Otherwise, the notification is not verified and one or more appropriate actions can be taken (e.g., the notification message is discarded, e.g., because it may be from a malicious entity).

When Service Producer A fails or gets replaced, a new or backup service producer (denoted as Service Producer B) obtains the subscription context from either Service Producer A or from a context storage (step 612). Service Producer B uses the same notification ID and Ks to send a notification message to the service consumer when the corresponding event occurs (step 614). Consequently, the service consumer does not need to be aware of the service producer failure and backup. While not illustrated, the service consumer verifies the notification message received in step 614 in the same manner described above with respect to step 610. If the notification message is successfully verified, the service consumer then consumes the event data.

Note that Service Producer A and Service Producer B are separate instances of the same type of NF (e.g., two instances of an AMF).

Regarding unsubscribing from notifications of the event, since the service producer instance may be changed due to failure or replacement, the service consumer may not know to which service producer it is to send the unsubscribe message. Therefore, it can either send the unsubscribe request to the service producer instance from whom it received the last notification message, or to the service producer instance from whom it receives the next notification message. Note that in the former case, the unsubscribe message can be sent upon making the determination to unsubscribe. Conversely, for the latter, the service consumer waits until the next notification message is received (after making the decision to unsubscribe) in order to determine the service producer instance to which to send the unsubscribe message and then sends the unsubscribe message to that service producer instance.

Figure 7:
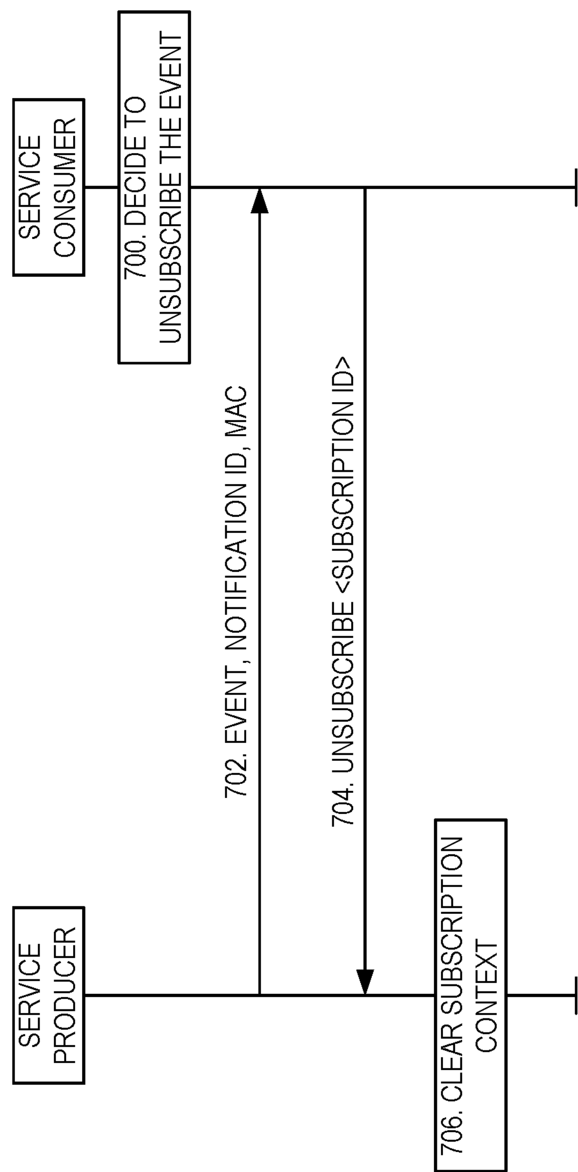
FIG. 7 illustrates the operation of a service producer and a service consumer to perform an unsubscribe procedure using Ks as the credential in accordance with some embodiments of the present disclosure.

In this regard, FIG. 7 illustrates the operation of a service producer and a service consumer to perform an unsubscribe procedure using Ks as the credential in accordance with some embodiments of the present disclosure. In the example of FIG. 7 the service consumer sends the unsubscribe message to the service producer from whom it receives the next notification message for the event. More specifically, as illustrated in FIG. 7, the service consumer decides to unsubscribe from the event (step 700). Thereafter, the service consumer receives a notification message for the event from a service producer instance (step 702). Upon receiving the notification message (and verifying the notification message as described above), the service consumer (i.e., using the notification message as a trigger) sends an unsubscribe message to the service producer from which the notification message was received (step 704). In this example, the unsubscribe message includes the subscription ID. The service producer clears the subscription context for the service consumer such that the service consumer is unsubscribed from the event (step 706).

Figure 8:
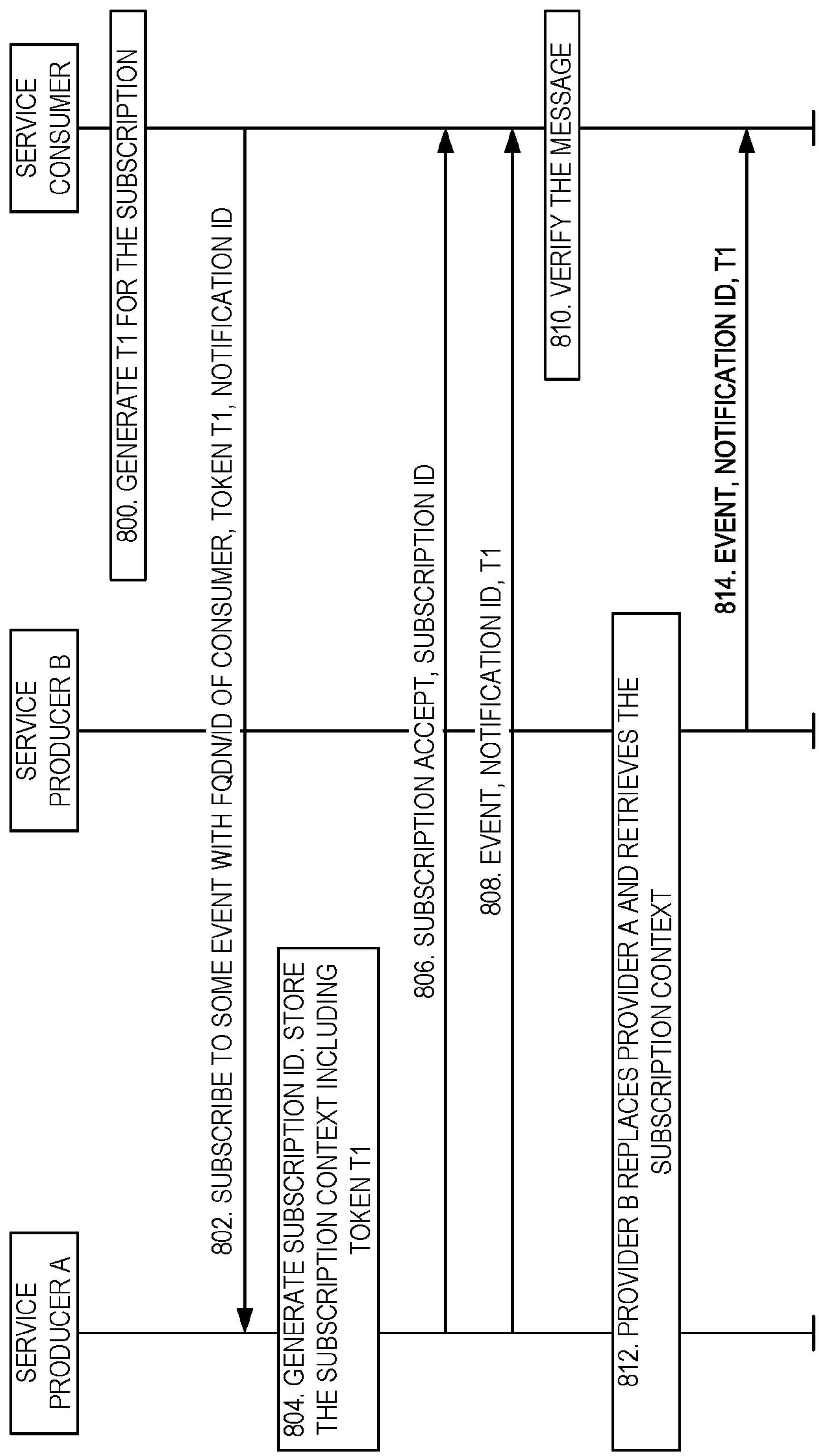
FIG. 8 illustrates the operation of a service producer, a replacement service producer, and a service consumer to utilize a token as the security information, or credential, during a subscription and notification procedure in accordance with some embodiments of the present disclosure.

In the examples of FIGS. 6 and 7, Ks is used as the credential. FIG. 8 illustrates an example in which a token is alternatively used as the credential. A token is an information entity indicating the corresponding user has been authorized to do some actions, more details can be found in [5]. In this regard, as illustrated, when the service consumer wants to subscribe to an event, the service consumer generates a token (denoted as T1) for this subscription (step 800). Mechanisms for generating tokens are well-known and, as such, are not the subject of the present disclosure. Any appropriate mechanism for generating T1 may be used. As an example, in some embodiments, T1 is a bearer token [5], including the following information: notification ID, subscription event information, expiration time, and a token authenticator. The token authenticator is similar to a MAC, and it is generated as:

$$\text{token authenticator} = HASH(K, \text{token data}),$$

where the token data includes everything in the token, except the token authenticator. K is a key maintained by the service consumer. The service consumer sends a subscription request to a service producer (denoted as Service Producer A) of the service (step 802). T1 is included in the subscription request. In addition, the subscription request may include information such as, e.g., a FQDN or ID of the service consumer and/or a notification ID.

Service Producer A generates a subscription ID for the subscription of the service consumer (e.g., as defined in [2]) and stores a subscription context for the service consumer (step 804). The subscription context includes T1. The subscription context may also include other information such as, e.g., the FQDN or ID of the service consumer, the notification ID, and/or the subscription ID. The subscription context may, for example, be stored at Service Producer A or in some storage that is accessible to Service Producer A and, e.g., any replacement service producer. Service Producer A sends an acceptance message back to the service consumer (step 806). In this example, the acceptance message includes the subscription ID.

Service Producer A will include T1 in every notification message sent to the service consumer for the event. Thus, when the corresponding event occurs, Service Producer A sends a notification message to the service consumer (step 808). In this example, the notification message includes event data, the notification ID, and T1. The service consumer verifies the notification message based on T1 comprised in the notification message (step 810). More specifically, in this example, the service consumer uses K and the token data included in T1 (from the notification message) to compute an expected token authenticator using the same algorithm used by the service consumer to compute the token authenticator included in T1 in the subscribe message of step 802. In this example, the expected token authenticator is computed as:

$$\text{Expected Token Authenticator} = HASH(K, \text{token data}'),$$

where K is the key maintained by the service consumer and token data' is the token data included in the token T1 in the notification message. The service consumer then compares the generated expected token authenticator to the token authenticator comprised in T1 the notification message. If they are the same, then the notification message is verified and the service consumer will consume the notification message and, in particular, the event data included in the notification message. Otherwise, the notification is not verified and one or more appropriate actions can be taken (e.g., the notification message is discarded, e.g., because it may be from a malicious entity).

When Service Producer A fails or gets replaced, a new or backup service producer (denoted as Service Producer B) obtains the subscription context from either Service Producer A or from a context storage (step 812). Service Producer B uses the same notification ID and T1 to send a notification message to the service consumer when the corresponding event occurs (step 814). Consequently, the service consumer does not need to be aware of the service producer failure and backup. While not illustrated, the service consumer verifies the notification message received in step 814 in the same manner described above with respect to step 810. If the notification message is successfully verified, the service consumer then consumes the event data.

Note that Service Producer A and Service Producer B are, e.g., separate instances of the same type of NF (e.g., two instances of an AMF) or separate instances of the type service exposed by a particular type of NF.

Also note that token T1 can be obtained by a third party during transportation if the corresponding message is not encrypted. Therefore, the communication between the service producer and the service consumer is encrypted, e.g. with Transport Layer Security (TLS) as defined in 3GPP Technical Specification (TS) 33.501 [4].

Regarding unsubscription, when using token T1, the process for unsubscribe is the same as described above with respect to FIG. 7, except the notification message of step 702 (and resulting verification) is based on the token T1, as described above with respect to FIG. 8.

Now, the discussion will turn to some example embodiments for achieving persistent handling of event messages, thus masking the failures/replacements of the service consumer using a data storage component as part of the service consumer and service producer, respectively. Note that other means to achieve persistence can also be foreseen.

Figure 9:
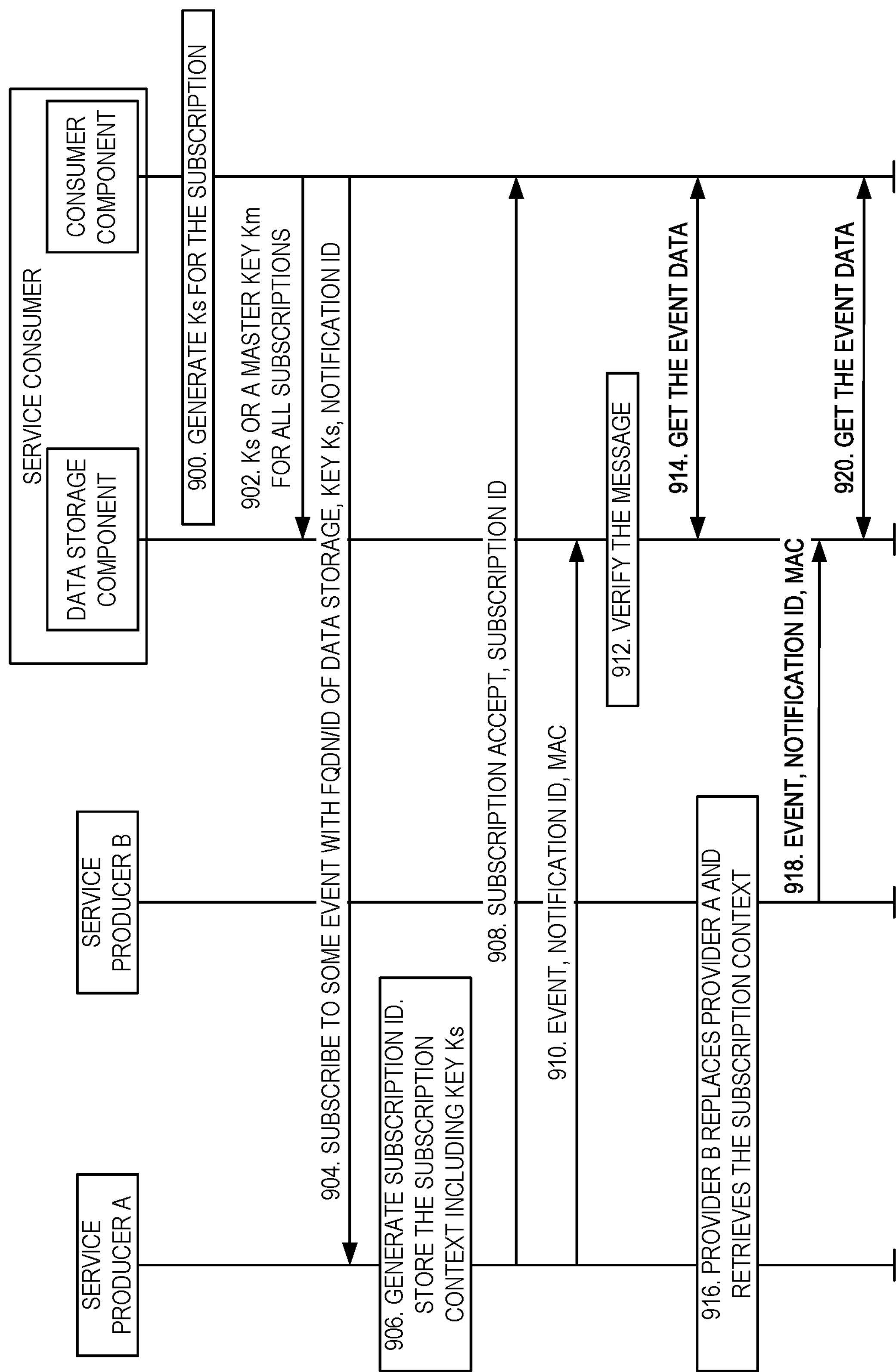
FIG. 9 illustrates the operation of a service producer, a replacement service producer, and a service consumer to utilize a key as the security information, or credential, during a subscription and notification procedure in which persistence is achieved via a data storage component at the service consumer in accordance with some embodiments of the present disclosure.

In this regard, FIG. 9 illustrates the operation of a service producer, a replacement service producer, and a service consumer to utilize a key as the security information, or credential, during a subscription and notification procedure in which persistence is achieved via a data storage component at the service consumer in accordance with some embodiments of the present disclosure. As illustrated, the service consumer includes both a data storage component and a consumer component. The data storage component and the consumer component may be implemented in any desired manner. As an example, the data storage component and the consumer component may be implemented as separate software components of a single NF. As another example, the data storage component may be implemented at a first NF (e.g., a UDR or UDSF) and the consumer component may be implemented at a second NF (e.g., at an AMF, SMF, etc. where the service consumer consumes a service desired by the UPF from a corresponding service producer).

In the example of FIG. 9, the data storage component of the service consumer is used to receive and verify the event data. As such, the data storage component needs to be able to verify notification messages. To achieve this, the consumer component generates a key (denoted as Ks) for a particular subscription and, optionally, a master key (denoted as Km) for all subscriptions and sends and sends Ks or Km to the data storage component of the service consumer (steps 900 and 902). Mechanisms for generating keys are well-known and, as such, are not the subject of the present disclosure. If Km is given to the data storage component in step 902, the data storage component of the service consumer will use Km to generate Ks for authenticating notification messages.

In order to subscribe to the event, the consumer component sends a subscription request to a service producer (denoted as Service Producer A) of the corresponding service (step 904). Ks is included in the subscription request. In addition, the subscription request may include information such as, e.g., a FQDN or ID of the service consumer and/or a notification ID. Notably, the consumer component identifies, in the subscription request, the data storage component of the service consumer as the receiving endpoint for corresponding notification messages (i.e., tells the service producer to send notification messages to the data storage component of the service consumer). For example, the FQDN or ID included in the subscription request may be that of the data storage component of the service consumer.

Service Producer A generates a subscription ID for the subscription of the service consumer (e.g., as defined in [2]) and stores a subscription context for the service consumer (step 906). The subscription context includes $K_s$. The subscription context may also include other information such as, e.g., the FQDN or ID of the service consumer, the notification ID, and/or the subscription ID. The subscription context may, for example, be stored at Service Producer A or in some storage that is accessible to Service Producer A and, e.g., any replacement service producer. Service Producer A sends an acceptance message back to the service consumer (step 908). In this example, the acceptance message includes the subscription ID.

When the corresponding event occurs, Service Producer A sends a notification message to the service consumer, and in particular to the data storage component of the service consumer (step 910). In this example, the notification message includes event data, the notification ID, and a MAC. For example, MAC=HASH (Ks, event data). The data storage component of the service consumer verifies the notification message using the MAC comprised in the notification message and $K_s$, which is stored at the data storage component of the service consumer (or generated at the data storage component from Km) (step 912). More specifically, in this example, the data storage component of the service consumer uses $K_s$ and in this example the event data comprised in the notification message to generate an expected MAC using the same algorithm used by Service Producer A (e.g., expected MAC=HASH ($K_s$, event data)). The data storage component of the service consumer then compares the generated expected MAC to the MAC comprised in the notification message. If they are the same, then the notification message is verified and the data storage component of the service consumer will store the event data included in the notification message. Otherwise, the notification is not verified and one or more appropriate actions can be taken (e.g., the notification message is discarded, e.g., because it may be from a malicious entity). The data storage component of the service consumer communicates the event data (if successfully verified) to the consumer component (step 914).

When Service Producer A fails or gets replaced, a new or backup service producer (denoted as Service Producer B) obtains the subscription context from either Service Producer A or from a context storage (step 916). Service Producer B uses the same notification ID and Ks to send a notification message to the data storage component of the service consumer when the corresponding event occurs (step 918). Consequently, the service consumer does not need to be aware of the service producer failure and backup. While not illustrated, the data storage component of the service consumer verifies the notification message received in step 918 in the same manner described above with respect to step 912. If the notification message is successfully verified, the data storage component of the service consumer stores the event data and communicates the event data to the consumer component (step 920).

Note that, in steps 914 and 920, the consumer component obtains the event data from the data storage component using any suitable technique. As a first example, the data storage component keeps the state of which consumer component instance is responsible for which notification ID and forwards the event data to that consumer instance. As another example, the consumer component checks the data storage component for updates (e.g., periodically) using the corresponding notification ID and, in response, receives any new event data from the data storage component for that notification ID. As a third example, the data storage component broadcasts the notification ID associated with the event data to all associated consumer component instances. Then, the consumer component that receives the broadcast and desires the event data for the notification ID sends a request to the data storage component for the event data for that notification ID. In response, the data storage component sends the event data for that notification ID to the requesting consumer component.

Note that Service Producer A and Service Producer B are, e.g., separate instances of the same type of NF (e.g., two instances of an AMF) or separate instances of the same type of service exposed by a particular NF type.

Figure 10:
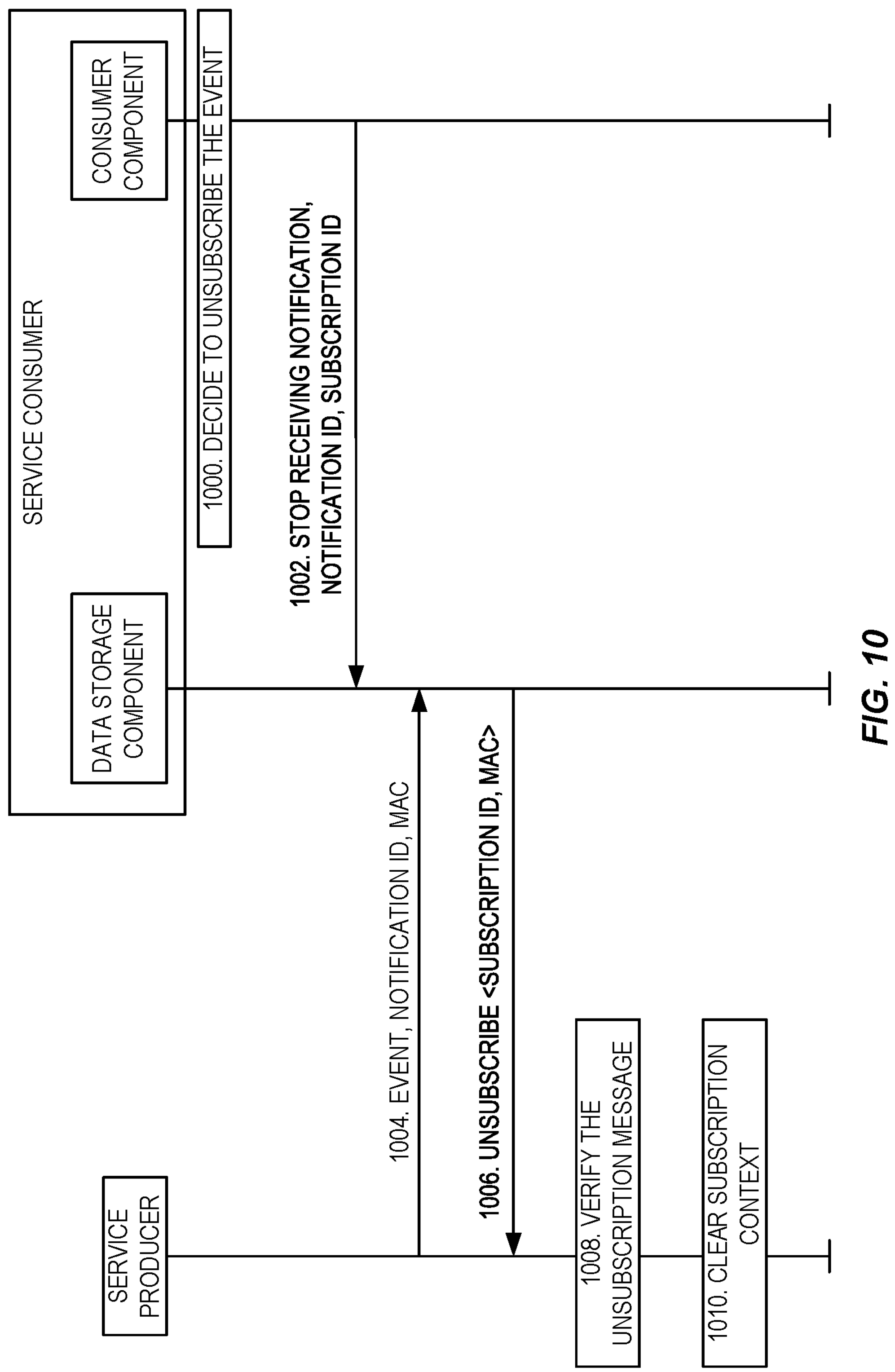
FIG. 10 illustrates the operation of a service producer and a service consumer to perform an unsubscribe procedure using a key as the credential where the service consumer includes a data storage component and a consumer component in accordance with some embodiments of the present disclosure.

FIG. 10 illustrates the operation of a service producer and a service consumer to perform an unsubscribe procedure using Ks as the credential where the service consumer includes a data storage component and a consumer component in accordance with some embodiments of the present disclosure. In the example of FIG. 10, the service consumer sends the unsubscribe message to the service producer from whom it receives the next notification message for the event. However, the service consumer may alternatively send the unsubscribe message to the service producer from whom it received the last notification message for the event.

As illustrated, in the example of FIG. 10, the consumer component decides to unsubscribe from the event (step 1000) and sends an instruction to the data storage component of the service consumer to stop receiving notification messages for the event (step 1002). This "stop" message includes the notification ID and subscription ID. Thereafter, the data storage component of the service consumer receives a notification message for the event (having the corresponding notification ID) from a service producer instance (step 1004). Upon receiving the notification message (and verifying the notification message as described above), the data storage component of the service consumer (i.e., using the notification message as a trigger) sends an unsubscribe message to the service producer from which the notification message was received (step 1006). In this example, the unsubscribe message includes the subscription ID and MAC. This MAC could be, e.g., HASH (Ks, subscription ID). The service producer verifies the unsubscribe message using the MAC (step 1008) and, if successfully verified, clears the subscription context for the service consumer such that the service consumer is unsubscribed from the event (step 1010). Note that the reason for adding a MAC in the unsubscribe message is because it is not sent by the original consumer component. Adding a MAC enables the service producer to verify the unsubscribe message.

Figure 11:
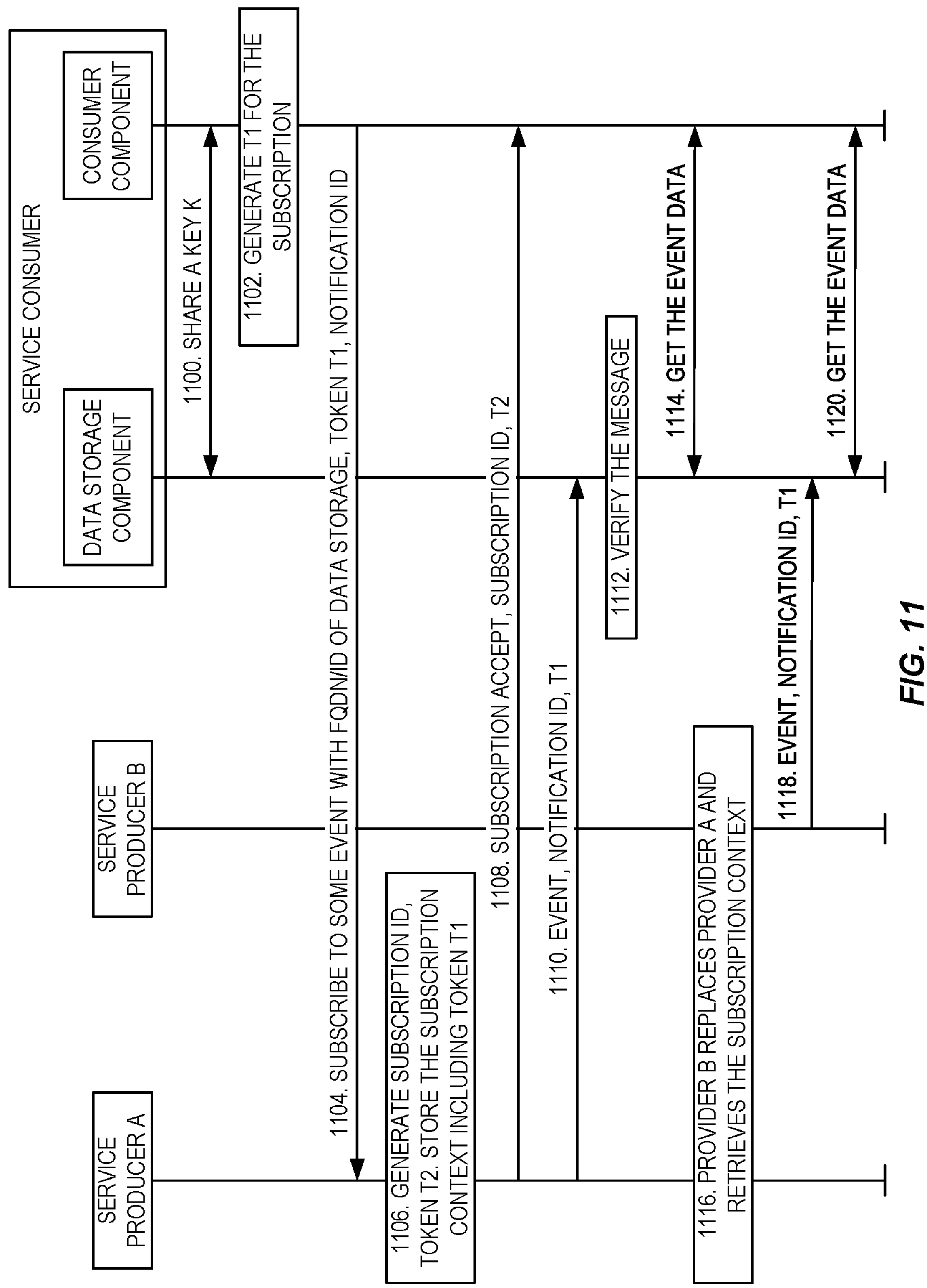
FIG. 11 illustrates the operation of a service producer, a replacement service producer, and a service consumer to utilize a token as the security information, or credential, during a subscription and notification procedure in which persistence is achieved via a data storage component at the service consumer in accordance with some embodiments of the present disclosure.
Figure 12:
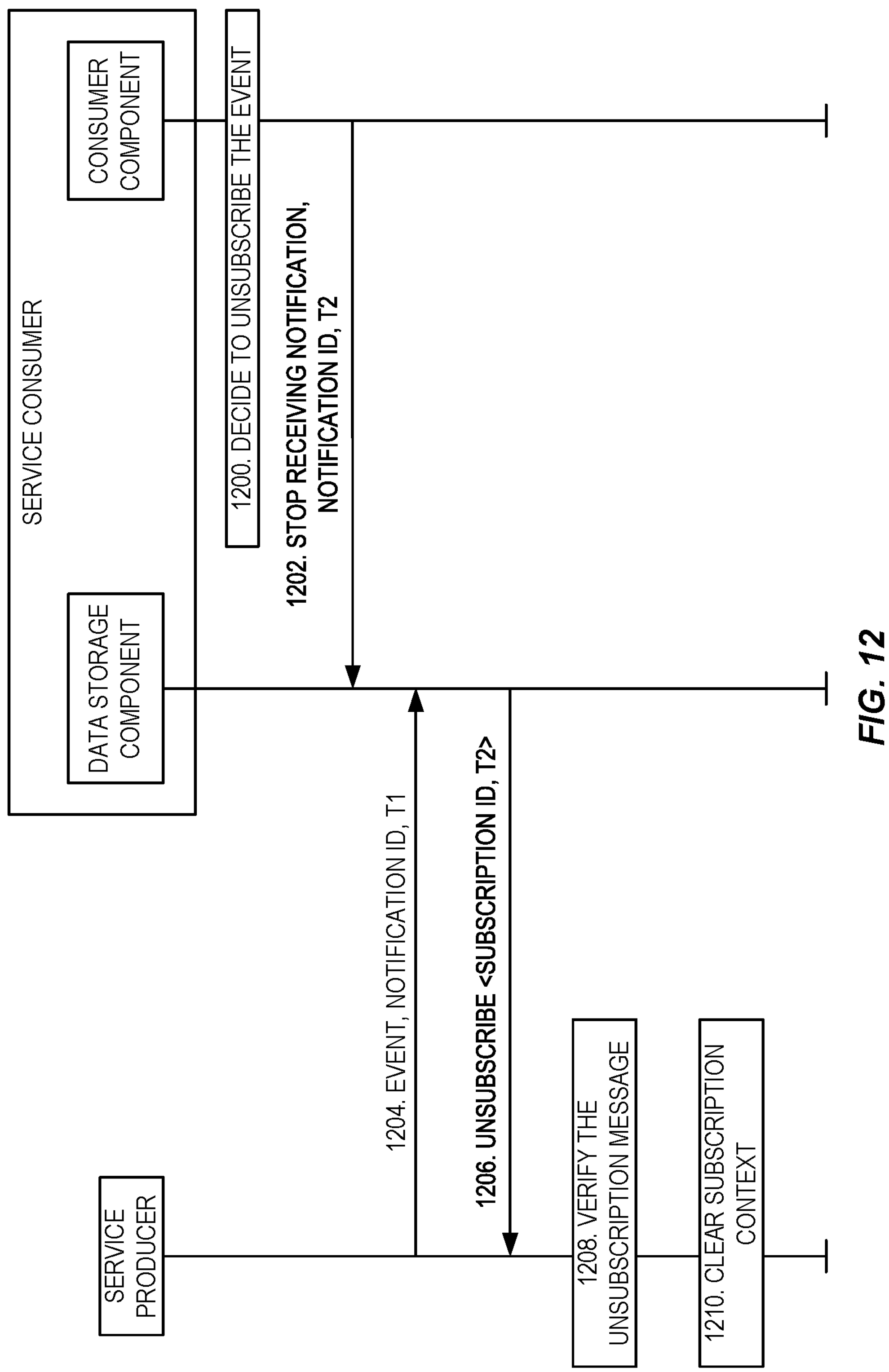
FIG. 12 illustrates the operation of a service producer and a service consumer to perform an unsubscribe procedure using a token as the credential where the service consumer includes a data storage component and a consumer component in accordance with some embodiments of the present disclosure.

In the examples of FIGS. 9 and 10, Ks is used as the credential. FIGS. 11 and 12 are similar but a token is alternatively used as the credential. Looking first at FIG. 11, the consumer component and the data storage component of the service consumer share a key K(step 1100). When the service consumer wants to subscribe to an event, the consumer component generates a token (denoted as T1) for this subscription (step 1102). Mechanisms for generating tokens are well-known and, as such, are not the subject of the present disclosure. Any appropriate mechanism for generating T1 may be used. As an example, in some embodiments, T1 is a bearer token [5], including the following information: notification ID, subscription event information, expiration time, and a token authenticator. The token authenticator is similar to a MAC, and it is generated as:

$$\text{token authenticator} = HASH(K, \text{token data}),$$

where the token data includes everything in the token, except the token authenticator. K is a key maintained by the service consumer. The consumer component sends a subscription request to a service producer (denoted as Service Producer A) of the service (step 1104). T1 is included in the subscription request. In addition, the subscription request may include information such as, e.g., a FQDN or ID of the service consumer and/or a notification ID. Notably, the consumer component identifies, in the subscription request, the data storage component of the service consumer as the receiving endpoint for corresponding notification messages (i.e., tells the service producer to send notification messages to the data storage component of the service consumer). For example, the FQDN or ID included in the subscription request may be that of the data storage component of the service consumer.

Service Producer A generates a subscription ID for the subscription of the service consumer (e.g., as defined in [2]) and stores a subscription context for the service consumer (step 1106). The subscription context includes T1. The subscription context may also include other information such as, e.g., the FQDN or ID of the service consumer, the notification ID, and/or the subscription ID. The subscription context may, for example, be stored at Service Producer A or in some storage that is accessible to Service Producer A and, e.g., any replacement service producer. Service Producer A sends an acceptance message back to the consumer component (step 1108). In this example, the acceptance message includes the subscription ID and a second token T2. The second token T2 is generated by the service provider, stored in the subscription context, and used to verify an unsubscribe message, as described below. As an example, T2 can include: subscription ID, subscription event information, expiration time, and a token authenticator, where the token authenticator could be, for example, HASH (key, token data), where key is maintained by the service producer and the token data includes everything in the token except the token authenticator.

Service Producer A will include T1 in every notification message sent to the service consumer for the event. Thus, when the corresponding event occurs, Service Producer A sends a notification message to the service consumer, and in particular to the data storage component of the service consumer (step 1110). In this example, the notification message includes event data, the notification ID, and T1. The data storage component of the service consumer verifies the notification message based on T1 comprised in the notification message (step 1112). More specifically, in this example, the data storage component of the service consumer uses K and the token data included in T1 (from the notification message) to compute an expected token authenticator using the same algorithm used by the consumer component to compute the token authenticator included in T1 in the subscribe message of step 1104. In this example, the expected token authenticator is computed as:

$$\text{Expected Token Authenticator} = HASH(K, \text{token data}'),$$

where K is the key maintained by the data storage component of the service consumer and token data' is the token data included in the token T1 in the notification message. The data storage component of the service consumer then compares the generated expected token authenticator to the token authenticator comprised in T1 the notification message. If they are the same, then the notification message is verified, and the data storage component of the service consumer stores the event data and communicates the event data to the consumer component (step 1114). Otherwise, the notification is not verified and one or more appropriate actions can be taken (e.g., the notification message is discarded, e.g., because it may be from a malicious entity).

When Service Producer A fails or gets replaced, a new or backup service producer (denoted as Service Producer B) obtains the subscription context from either Service Producer A or from a context storage (step 1116). Service Producer B uses the same notification ID and T1 to send a notification message to the data storage component of the service consumer when the corresponding event occurs (step 1118). Consequently, the service consumer does not need to be aware of the service producer failure and backup. While not illustrated, the data storage component of the service consumer verifies the notification message received in step 1118 in the same manner described above with respect to step 1112. If the notification message is successfully verified, the data storage component of the service consumer stores the event data and communicates the event data to the consumer component (step 1120).

Note that Service Producer A and Service Producer B are, e.g., separate instances of the same type of NF (e.g., two instances of an AMF) or separate instances of the same type of service exposed by a particular NF type.

Also note that token T1 can be obtained by a third party during transportation if the corresponding message is not encrypted. Therefore, the communication between the service producer and the service consumer is encrypted, e.g. with TLS as defined in 3GPP TS 33.501 [4].

FIG. 12 illustrates the operation of a service producer and a service consumer to perform an unsubscribe procedure using a token as the credential where the service consumer includes a data storage component and a consumer component in accordance with some embodiments of the present disclosure. In the example of FIG. 12, the service consumer sends the unsubscribe message to the service producer from whom it receives the next notification message for the event. However, the service consumer may alternatively send the unsubscribe message to the service producer from whom it received the last notification message for the event.

As illustrated, in the example of FIG. 12, the consumer component decides to unsubscribe from the event (step 1200) and sends an instruction to the data storage component of the service consumer to stop receiving notification messages for the event (step 1202). This "stop" message includes the notification ID and the token T2, which was received by the consumer component in step 1108 of FIG. 11 or otherwise obtained by the consumer component (e.g., obtained from a prior consumer component in the case of replacement or failure of the prior consumer component). Thereafter, the data storage component of the service consumer receives a notification message for the event (having the corresponding notification ID) from a service producer instance (step 1204). Upon receiving the notification message (and verifying the notification message as described above), the data storage component of the service consumer (i.e., using the notification message as a trigger) sends an unsubscribe message to the service producer from which the notification message was received (step 1206). In this example, the unsubscribe message includes the subscription ID and the token T2. The service producer verifies the unsubscribe message using the token T2 (step 1208) and, if successfully verified, clears the subscription context for the service consumer such that the service consumer is unsubscribed from the event (step 1210). Note that the reason for adding the token T2 in the unsubscribe message is because it is not sent by the original consumer component. Adding T2 enables the service producer to verify the unsubscribe message.

Figure 13:
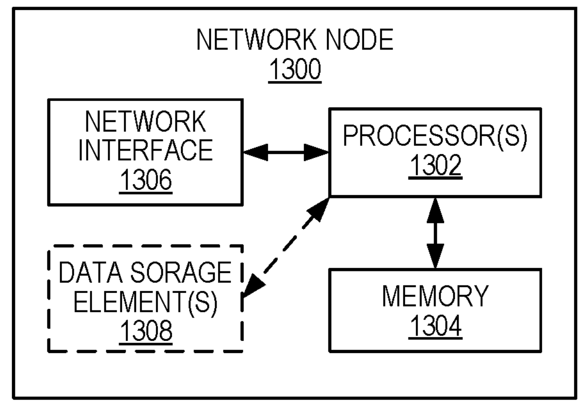
FIG. 13 is a schematic block diagram of a network node according to some embodiments of the present disclosure.

FIG. 13 is a schematic block diagram of a network node 1300 according to some embodiments of the present disclosure. The network node 1300 is a network node that implements a NF such as, e.g., a NF including a service producer of any of FIGS. 6 through 12; a NF serving including the service consumer of FIG. 6, FIG. 7, or FIG. 8; or a NF including the consumer component of FIG. 9, FIG. 10, FIG. 11, or FIG. 12) or a network node that implements the data storage component of the service consumer of FIG. 9, FIG. 10, FIG. 11, or FIG. 12.

As illustrated, the network node 1300 includes one or more processors 1302 (e.g., Central Processing Units (CPUs), Application Specific Integrated Circuits (ASICs), Field Programmable Gate Arrays (FPGAs), and/or the like), memory 1304, a network interface 1306, and optionally one or more data storage elements 1308 (e.g., one or more Solid State Drives (SSDs) or the like). The one or more processors 1302 are also referred to herein as processing circuitry. The one or more processors 1302 operate to provide one or more functions of a network node 1300 as described herein (e.g., one or more functions of a NF including a service producer of any of FIGS. 6 through 12; one or more functions of a NF including the service consumer of FIG. 6, FIG. 7, or FIG. 8; one or more functions of a NF including the consumer component of FIG. 9, FIG. 10, FIG. 11, or FIG. 12; or one or more functions of the data storage component of the service consumer of FIG. 9, FIG. 10, FIG. 11, or FIG. 12). In some embodiments, the function(s) are implemented in software that is stored, e.g., in the memory 1304 and executed by the one or more processors 1302.

Figure 14:
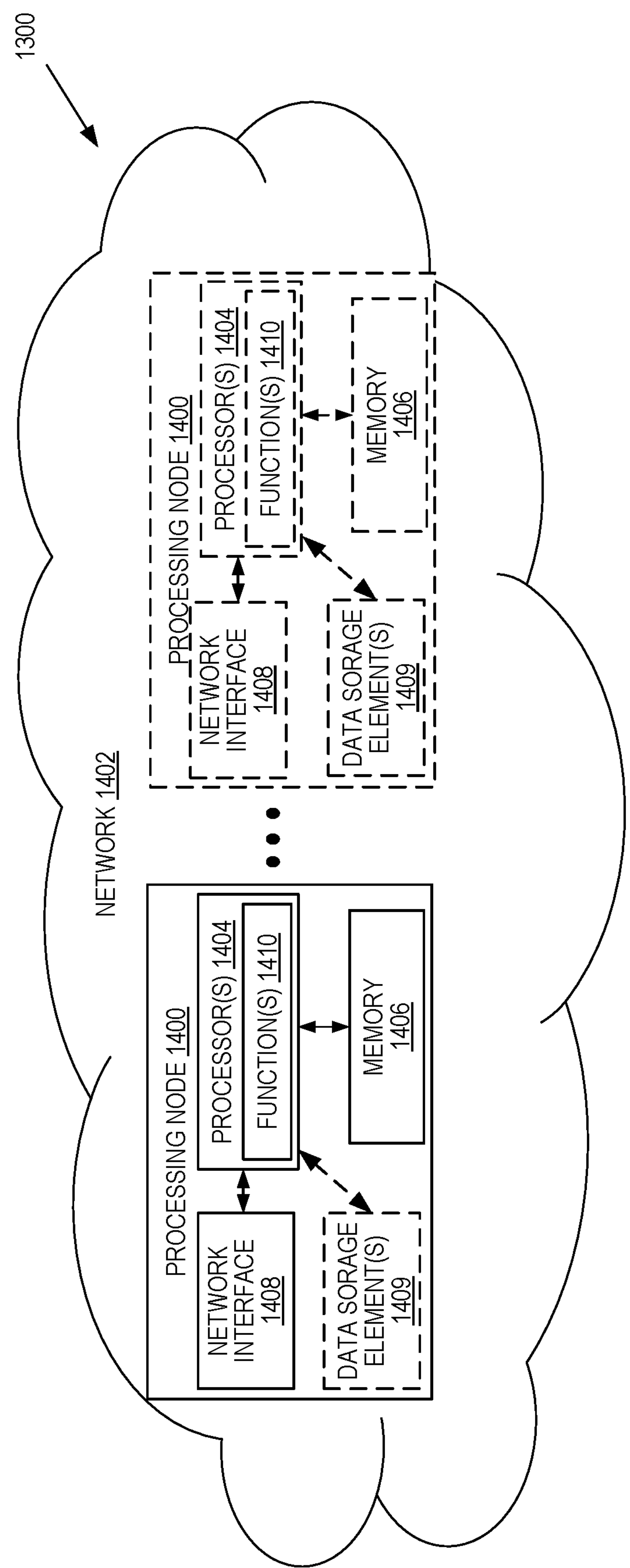
FIG. 14 is a schematic block diagram that illustrates a virtualized embodiment of the network node of FIG. 13 according to some embodiments of the present disclosure.

FIG. 14 is a schematic block diagram that illustrates a virtualized embodiment of the network node 1300 according to some embodiments of the present disclosure. As used herein, a "virtualized" network node is an implementation of the network node 1300 in which at least a portion of the functionality of the network node 1300 is implemented as a virtual component(s) (e.g., via a virtual machine(s) executing on a physical processing node(s) in a network(s)). As illustrated, in this example, the network node 1300 includes one or more processing nodes 1400 coupled to or included as part of a network 1402. Each processing node 1400 includes one or more processors 1404 (e.g., CPUs, ASICs, FPGAs, and/or the like) which are generally referred to herein as processing circuitry, memory 1406, a network interface 1408, and optionally one or more data storage elements 1409.

In this example, functions 1410 of the network node 1300 described herein (e.g., one or more functions of a NF including a service producer of any of FIGS. 6 through 12; one or more functions of a NF including the service consumer of FIG. 6, FIG. 7, or FIG. 8; one or more functions of a NF including the consumer component of FIG. 9, FIG. 10, FIG. 11, or FIG. 12; or one or more functions of the data storage component of the service consumer of FIG. 9, FIG. 10, FIG. 11, or FIG. 12) are implemented at the one or more processing nodes 1400 in any desired manner. In some particular embodiments, some or all of the functions 1410 of the network node 1300 described herein are implemented as virtual components executed by one or more virtual machines implemented in a virtual environment(s) hosted by the processing node(s) 1400.

In some embodiments, a computer program including instructions which, when executed by at least one processor, causes the at least one processor to carry out the functionality of the network node 1300 or a node (e.g., a processing node 1400) implementing one or more of the functions 1410 of the network node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
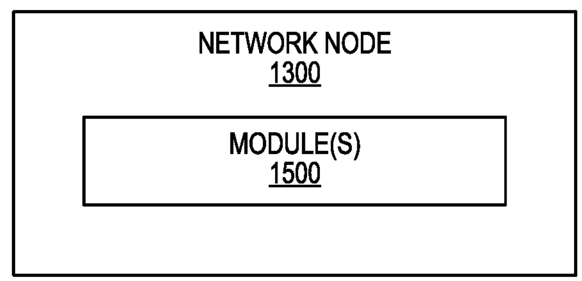
FIG. 15 is a schematic block diagram of the network node of FIG. 13 according to some other embodiments of the present disclosure.

FIG. 15 is a schematic block diagram of the network node 1300 according to some other embodiments of the present disclosure. The network node 1300 includes one or more modules 1500, each of which is implemented in software. The module(s) 1500 provide the functionality of the network node 1300 described herein (e.g., one or more functions of a NF including a service producer of any of FIGS. 6 through 12; one or more functions of a NF including the service consumer of FIG. 6, FIG. 7, or FIG. 8; one or more functions of a NF including the consumer component of FIG. 9, FIG. 10, FIG. 11, or FIG. 12; or one or more functions of the data storage component of the service consumer of FIG. 9, FIG. 10, FIG. 11, or FIG. 12). This discussion is equally applicable to the processing node 1400 of FIG. 14 where the modules 1500 may be implemented at one of the processing nodes 1400 or distributed across multiple processing nodes 1400.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core Network
5GS Fifth Generation System
AF Application Function
AMF Access and Mobility Management Function
AN Access Network
ASIC Application Specific Integrated Circuit
AUSF Authentication Server Function
CP Control Plane
CPU Central Processing Unit
DN Data Network
DSP Digital Signal Processor
eNB Enhanced or Evolved Node B
EPS Evolved Packet System
FPGA Field Programmable Gate Array
FQDN Fully Qualified Domain Name
gNB New Radio Base Station
HSS Home Subscriber Server
ID Identifier
IP Internet Protocol
LTE Long Term Evolution
MAC Message Authentication Code
MME Mobility Management Entity
MTC Machine Type Communication
NEF Network Exposure Function
NF Network Function
NFV Network Function Virtualization
NR New Radio
NRF Network Repository Function
NSSF Network Slice Selection Function
PCF Policy Control Function
PDU Protocol Data Unit
P-GW Packet Data Network Gateway
QoS Quality of Service
RAM Random Access Memory
RAN Radio Access Network
ROM Read Only Memory
RRH Remote Radio Head
RU Round Trip Time
SBA Service Based Architecture
SCEF Service Capability Exposure Function
SDN Software Defined Networking
SMF Session Management Function
SSD Solid State Drive
TLS Transport Layer Security
TS Technical Specification
UDM Unified Data Management
UE User Equipment
UPF User Plane Function
URL Uniform Resource Locator Those skilled in the art will recognize improvements and modifications to the embodiments of the present disclosure. All such improvements and modifications are considered within the scope of the concepts disclosed herein.

REFERENCES

[1] System Architecture for 5G system TS 23.501, https://portal.3gpp.org/desktopmodules/Specifications/SpecificationDetails.aspx?sp ecificationId=3144
[2] Procedures for 5G system TS 23.502, https://portal.3gpp.org/desktopmodules/Specifications/SpecificationDetails.aspx?sp ecificationId=3145
[3] 5G System; Technical Realization of Service Based Architecture; Stage 3, TS 29.500 https://portal.3gpp.org/desktopmodules/Specifications/SpecificationDetails.aspx?sp ecificationId=3338
[4] Security architecture and procedures for 5G System, TS 33.501 https://portal.3gpp.org/desktopmodules/Specifications/SpecificationDetails.aspx?sp ecificationId=3169
[5] The OAuth 2.0 Authorization Framework https://tools.ietf.org/html/rfc6749

What is claimed is:

1. A method for subscription and notification of events in a core network of a cellular communications system in which the core network has a service-based architecture, the method comprising:
at a service consumer in the core network:
generating security information for a subscription to an event; and
sending a subscribe message comprising the security information to a service producer in the core network, the service producer being a service producer of the event;
at the service producer:
receiving the subscribe message comprising the security information from the service consumer; and
sending a notification message to the service consumer, the notification message comprising the event and either: the security information or information derived from the security information; and
at the service consumer:
receiving the notification message from the service producer; and
verifying the notification message based on:
the security information or the information derived from the security information, comprised in the notification message; and
the security information generated at the service consumer.

2. A method performed by a service consumer for subscription and notification of events in a core network of a cellular communications system in which the core network has a service-based architecture, the method comprising:
generating first security information for a subscription to an event;

sending a subscribe message to a service producer of the event, the subscribe message comprising the first security information;

receiving a notification message from the service producer, the notification message comprising the event and second security information, the second security information comprising the first security information or information derived from the first security information; and verifying the notification message based on the first security information generated at the service consumer and the second security information comprised in the notification message.

3. The method of claim 2 wherein the first security information comprises a security key, and the second security information comprises information derived from the security key.

4. The method of claim 2 wherein the first security information comprises a token, and the second security information comprises the token.

5. The method of claim 2 wherein the subscribe message further comprises:

information that identifies the service consumer; or information that identifies a data storage component of the service consumer.

6. The method of claim 2 wherein the subscribe message further comprises:

a Fully Qualified Domain Name, FQDN, of the service consumer, a Uniform Resource Locator, URL, of the service consumer, or an Internet Protocol, IP, address of the service consumer; or a FQDN of a data storage component of the service consumer, a URL of the data storage component of the service consumer, or an IP address of the data storage component of the service consumer.

7. The method of claim 2 wherein the subscribe message further comprises a notification identifier, ID, and the notification message comprises the notification ID.

8. The method of claim 2 further comprising receiving a subscription accept message in response to the subscribe message, the subscription accept message comprising a subscription ID.

9. The method of claim 2 wherein:

the service consumer comprises a data storage component and a consumer component that consumes the event; and receiving the notification message from the service producer comprises receiving the notification message at the data storage component.

10. The method of claim 9 wherein verifying the notification message comprises verifying the notification message at the data storage component.

11. The method of claim 10 further comprising communicating the event from the data storage component to the consumer component of the service consumer.

12. The method of claim 2 further comprising:

deciding to unsubscribe from the event; and sending an unsubscribe message to either the service producer that sent a last notification message for the event or a service producer that sends a next notification message for the event.

13. The method of claim 12 wherein the unsubscribe message comprises third security information, the third security information being information derived from the first security information.

14. The method of claim 12 further comprising:

receiving third security information from the service producer;

wherein the unsubscribe message comprises the third security information.

15. A service consumer for subscription and notification of events in a core network of a cellular communications system in which the core network has a service-based architecture, the service consumer adapted to:

generate first security information for a subscription to an event;

send a subscribe message to a service producer of the event, the subscribe message comprising the first security information;

receive a notification message from the service producer, the notification message comprising the event and second security information, the second security information comprising the first security information or information derived from the first security information; and verify the notification message based on the first security information generated at the service consumer and the second security information comprised in the notification message.

16. The service consumer of claim 15 wherein the service consumer comprises:

a network node that implements a network function that comprises the service consumer, wherein the network node comprises:

a network interface; and processing circuitry associated with the network interface, the processing circuitry configured to cause the network node to implement the network function such that the service consumer is adapted to:

generate the first security information for the subscription to the event;

send the subscribe message to the service producer of the event, the subscribe message comprising the first security information;

receive the notification message from the service producer, the notification message comprising the event and the second security information, the second security information comprising the first security information or information derived from the first security information; and verify the notification message based on the first security information generated at the service consumer and the second security information comprised in the notification message.

17. The service consumer of claim 15 wherein the service consumer comprises:

one or more network nodes that implement a service consumer, the service consumer comprising a data storage component and a consumer component, wherein each network node of the one or more network nodes comprises:

a network interface; and processing circuitry associated with the network interface;

wherein the processing circuitry of the one or more network nodes is configured to cause the one or more network nodes to implement the service consumer such that:

the consumer component of the service consumer is adapted to:

generate the first security information for the subscription to the event; and send the subscribe message to the service producer of the event, the subscribe message comprising the first security information; and the data storage component of the service consumer is adapted to:

receive the notification message from the service producer, the notification message comprising the event and the second security information, the second security information comprising the first security information or information derived from the first security information;

verify the notification message based on the first security information generated at the service consumer and the second security information comprised in the notification message; and communicate the event to the consumer component of the service consumer.

18. A method performed by a service producer for subscription and notification of events in a core network of a cellular communications system in which the core network has a service-based architecture, the method comprising:

receiving a subscribe message from a service consumer for a subscription to an event, the subscribe message comprising first security information for the subscription to the event;

storing the first security information in a subscription context for the subscription to the event by the service consumer; and sending a notification message to the service consumer, the notification message comprising the event and second security information, the second security information comprising the first security information or information derived from the first security information.

19. A service producer for subscription and notification of events in a core network of a cellular communications system in which the core network has a service-based architecture, the service producer adapted to:

receive a subscribe message from a service consumer for a subscription to an event, the subscribe message comprising first security information for the subscription to the event;

store the first security information in a subscription context for the subscription to the event by the service consumer; and send a notification message to the service consumer, the notification message comprising the event and second security information, the second security information comprising the first security information or information derived from the first security information.

20. The service producer of claim 19 wherein the service producer comprises:

a network node that implements a network function that comprises the service producer, wherein the network node comprises:

a network interface; and processing circuitry associated with the network interface, the processing circuitry configured to cause the network node to implement the network function such that the service producer is adapted to:

receive the subscribe message from the service consumer for the subscription to the event, the subscribe message comprising the first security information for the subscription to the event;

store the first security information in the subscription context for the subscription to the event by the service consumer; and send the notification message to the service consumer, the notification message comprising the event and the second security information, the second security information comprising the first security information or information derived from the first security information.

* * * * *